United States Patent
McCloghrie et al.

(10) Patent No.: US 6,757,901 B1
(45) Date of Patent: Jun. 29, 2004

(54) METHOD AND SYSTEM FOR SETTING EXPRESSIONS IN NETWORK MANAGEMENT NOTIFICATIONS AT AN AGENT

(75) Inventors: Keith McCloghrie, Middletown, NY (US); Ramanathan Kavasseri, Fremont, CA (US); Sandra Durham, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 480 days.

(21) Appl. No.: 09/746,558

(22) Filed: Dec. 21, 2000

(51) Int. Cl.$^7$ ................................................. G06F 9/46
(52) U.S. Cl. .................... 719/318; 719/317; 709/202
(58) Field of Search ............................... 709/317, 318, 709/312, 313, 314, 315, 316, 200, 201, 202, 217; 719/317, 318, 316

(56) References Cited

U.S. PATENT DOCUMENTS

| | | | | |
|---|---|---|---|---|
| 6,047,279 A | * | 4/2000 | Barrack et al. ................ | 706/60 |
| 6,069,873 A | * | 5/2000 | Pugaczewski et al. ...... | 370/241 |
| 6,085,237 A | * | 7/2000 | Durham et al. ............. | 709/221 |
| 6,363,421 B2 | * | 3/2002 | Barker et al. ................ | 709/223 |
| 6,549,943 B1 | * | 4/2003 | Spring ......................... | 709/223 |
| 6,597,689 B1 | * | 7/2003 | Chiu et al. ................... | 370/354 |

OTHER PUBLICATIONS

RFC 1905 "Protocol Operations for Version 2 of the Simple Network Management Protocol (SNMPv2)" International Network Services, Jan. 1996.
RFC 1157 "A Simple Network Management Protocol (SNMP)" MIT Laboratory for Computer Science, May 1990.
RFC 1213 "Management Information Base for Network Management of TCP/IP–based Internets: MIB–II" Performance Systems International, Mar. 1991.

* cited by examiner

Primary Examiner—John Follansbee
Assistant Examiner—Haresh Patel
(74) Attorney, Agent, or Firm—Ritter, Lang & Kaplan LLP

(57) ABSTRACT

A method for generating notification based expressions includes identifying notifications supported by an agent and specifying objects for at least one of the notifications. One or more expressions are defined based on objects specified for the notification. The method further includes sending a list of objects and expressions to the agent to configure the notifications received at a management station upon occurrence of an event at the agent.

25 Claims, 10 Drawing Sheets

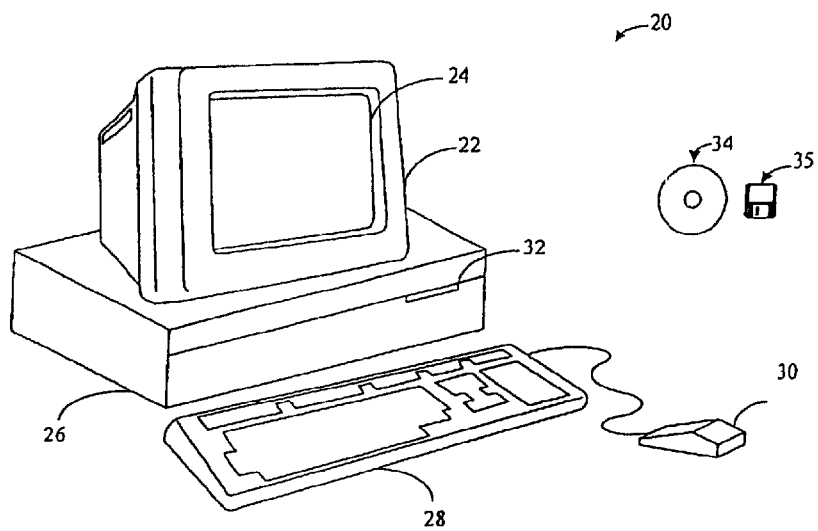
Fig. 4     Prior Art
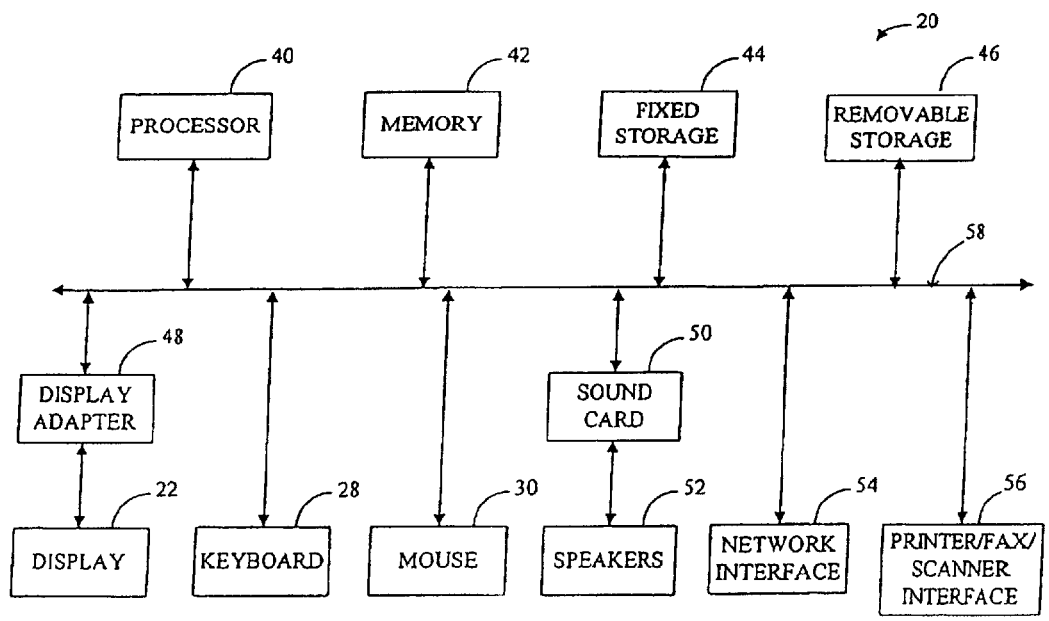
Fig. 5     Prior Art

| NOTIFICATION INDEX | NOTIFICATION LIST |
|---|---|
| 1 | linkUp |
| 2 | linkDown |
| 3 | ciscoPingCompletion |

FIG. 8

| NOTIFICATION INDEX | VARBIND INDEX | VARBIND LIST |
|---|---|---|
| 1 | 1 | ifIndex |
| 1 | 2 | ifDescr |
| 1 | 3 | ifType |
| 2 | 1 | ifIndex |
| 2 | 2 | ifDescr |
| 2 | 3 | ifType |
| 3 | 1 | ciscoPingCompleted |
| 3 | 2 | ciscoPingSentPackets |
| 3 | 3 | ciscoPingReceivedPackets |

FIG. 9

| NOTIFICATION INDEX | VARBIND INDEX | VARBIND LIST |
|---|---|---|
| 1 | 1 | ifIndex |
| 1 | 2 | ifAdminStatus |
| 1 | 3 | ifOperStatus |
| 1 | 4 | IfDescr |
| 1 | 5 | IfType |
| 2 | 1 | ifIndex |
| 2 | 2 | ifAdminStatus |
| 2 | 3 | ifOperStatus |
| 2 | 4 | IfDescr |
| 2 | 5 | IfType |
| 3 | 1 | ciscoPingCompleted |
| 3 | 2 | ciscoPingSentPackets |
| 3 | 3 | ciscoPingReceivedPackets |
| . | . | . |
| . | . | . |
| . | . | . |

METHOD AND SYSTEM FOR SETTING EXPRESSIONS IN NETWORK MANAGEMENT NOTIFICATIONS AT AN AGENT

BACKGROUND OF THE INVENTION

The present invention relates generally to network management, and more particularly, to setting expressions in network management notifications.

It is desirable to manage and control nodes of a network such as a TCP/IP network from one or more network management stations connected to the network. The network management stations monitor and control other nodes in the network including hosts, routers, etc. A protocol known as the Simple Network Management Protocol (SNMP) is used to communicate management information between network management stations (NMS) and SNMP agent software operating on other network nodes, or the same node as the network management station. SNMP is described in Case, RFC 1157, "A Simple Network Management Protocol (SNMP)," (Internet Engineering Task Force May 1990), the contents of which are incorporated by reference herein. Using SNMP in a TCP/IP network, a network management station may monitor traffic at a remote node and modify network operation parameters at the remote node.

FIG. 1 is a block diagram illustrating an exemplary network utilizing SNMP. The network includes at least one management station 10 which controls a plurality of nodes such as workstation 11, bridge 12, router 14, printer 15, or other peripheral devices (e.g., personal computers, hubs, repeaters). The management station 10 includes a SNMP manager 16 (command generator and notification receiver). In order for an SNMP management station 10 to manage a node, the node must be able to run an SNMP agent 17 (command responder and notification originator), which is an SNMP management process typically encoded in software (some nodes may use a hardware implementation).

To facilitate SNMP operation, nodes of the network including the network management stations 10 maintain network management information databases known as MIBs (management information bases) 18. MIBs are described in McCloghrie, et al., RFC 1213, "Management Information Base for Network Management of TCP/IP Based Internets: MIB-II" (Internet Engineering Task Force March 1991), the contents of which are incorporated by reference herein.

The MIB 18 at each node consists of many individual objects, each having one or more instance. Each instance has a single value. For example, a particular node may include within its MIB an object whose value specifies the total number of IP datagrams received at that node, including those received in error. Each MIB 18 includes a large number of such objects. The object instances and their corresponding values are carried in packets called protocol data units (PDUs) and contain operating parameters, statistics, and control information for the element and its components.

Each MIB object is uniquely identified by a series of integers called in Object Identifier (OID). For example, the object ifinOctets is represented by the OID 1.3.6.1.2.2.1.10. There can be many instances of an object in existence on an agent. For example, there is one instance (and value) of ifinOctets for every physical interface known to the agent. Each instance is identified by appending one or more additional integers to the OID (e.g., 1.3.6.1.2.1.2.2.1.10.x, where x is an integer greater than zero). The first element of this specific OID identifies an overall object identifier domain allocated to the ISO. The second element has the value 3 which is defined as indicating allocation toward an organization under the auspices of the ISO. The third element identifies the US Department of Defense (DOD) as the responsible organization. The fourth element has the value of 1 and identifies the Internet. The fifth element indicates that the identifier is used for management. The remaining elements identify the particular object types with greater specificity.

The organization of objects within an MIB may be illustrated as a tree structure. An example of a portion of such a tree structure is illustrated in FIG. 2. The leaves of the tree instances of individual objects. FIG. 2 shows the MIB tree from its root, "ISO", to some of its lower branches. A first branch 21 of primary interest includes the standard MIB objects defined by RFC 1213. A second branch 23 includes MIB objects defined for use by Cisco Systems. The illustration of FIG. 2 does not extend down to individual leaves but rather indicates the prefix of elements in OIDs for various classes of objects. For example, OIDs from MIB objects pertaining to TCP would begin with 1.3.6.1.2.1.6.

The management station communicates with the agents over the network using the SNMP protocol, which allows the management station to query the state of the agent's local objects and modify them if necessary. SNMP is a request response protocol by which the variables of an agent's MIB may be inspected or altered. The protocol is described in RFC 1905, "Protocol Operations for Version 2 of the Simple Network Management Protocol", Case, McCloghrie, Rose & Waldbusser, January 1996, the contents of which are incorporated by reference herein.

A typical SNMP operation involves management station sending an SNMP message to agent requesting a particular local parameter. The agent then recovers this parameter by accessing a particular object in the MIB and responds to the request with a reply to the management station including the parameter value. SNMP operations are defined on a list of MIB variable instances called a variable binding (varbind) list. Each element of a varbind list describes a specific MIB variable instance. A varbind element specifies three MIB instance attributes: its object identifier, data type, and value.

The management protocol provides for the exchange of messages which convey management information between the agents and management stations. For example, the management station may send a request to an agent asking it for information or commanding it to update its state in a certain way. The agent typically replies with the requested information or confirms that it has updated its state as requested. Conventional message types include Get, GetNext, GetBulk, Set, Trap and Inform. The Get operation is used by the system to retrieve the value of one or more object instances from an agent. The GetNext operation is used by the system to retrieve the value of the next object instance in a table or list within an agent. The GetBulk operation is used by the system to efficiently retrieve large blocks of data, such as large tables. The Set operation is used by the network management station to set the values of object instances within an agent. The Trap operation is used by agents to asynchronously inform the network management station of a event of interest to one or more network management stations. Notification originators can generate informs, which are notifications that should be acknowledged by notification receivers. In an acknowledgement is not received within a configurable time-window, the notification originator attempts to resend the inform up to a maximum of N returns, where N is a configurable integer.

The Trap and Inform operations may be used to send notifications to the manager.

Notifications are unsolicited messages sent from an agent to the SNMP manager to apprise the manager of network events. SNMP notifications allow the agent to initiate communication with management applications when an event of interest to one or more network management stations takes place. These events include cold start, warm start, link down, link up, authentication failure, neighbor loss, and enterprise. SNMP notifications contain a sequence of SNMP objects that typically provide context information on why each notification was generated.

As shown in FIG. 3, the agent 17 may contain an expression MIB 19 along with its other MIBs 18. An expression MIB 19 is a special type of MIB that contains variables which are evaluated expressions of variables contained in another MIB on that agent 17. It is sometimes advantageous for a management station 10 to evaluate expressions of the variables contained in the MIBs 18 of each agent 17. This is generally done to reduce network bandwidth, to conserve CPU utilization that goes into packaging data into SNMP PDUs, or to monitor the behavior of a router in a scalable manner by off-loading simple computations to the managed agent itself. For example, a MIB 18 may contain variables A and B. In order to test for a certain property, it may be necessary to check whether A+B exceeds a certain predefined value. These expressions are evaluated on the agent either on demand (in response to a Get/GetNext request for the results of an expression) or at regular time intervals. Expressions are currently used only in synchronous operations. Since the objects within the notification cannot easily be determined or reconfigured, expressions are not set based on objects contained in an SNMP notification.

There is, therefore, a need for a method and system that provides for evaluation of an expression upon generation of a notification.

SUMMARY OF THE INVENTION

A method and system for setting expressions in network management notifications are disclosed. In one embodiment of the invention, the method generally comprises identifying notifications supported by an agent and specifying objects for at least one of the notifications. One or more expressions are defined based on the object specified for the notification and a list of objects and expressions is sent to the agent to configure the notifications received at a management station upon occurrence of an event at the agent.

In another aspect of the invention a method for setting expressions in an agent generally comprises receiving a message from a management station specifying objects for notifications supported by the agent and expressions based on the objects. The agent then sets expressions for the notifications. The expressions are evaluated when a notification containing the expression is generated and an action is performed based on the evaluated expression.

In yet another aspect of the invention a computer program product for setting expressions in an agent generally comprises code that receives a message from a management station specifying objects for notifications supported by the agent and expressions based on the objects and code that sets expressions for the notification. The products further include code that evaluates the expressions when the notification containing the expression is generated, code that performs an action based on the evaluated expression, and a computer readable storage medium for storing the code.

A system for setting expressions at an agent generally comprises means for receiving a message from a management station specifying objects for notifications supported by the agent and expressions based on the objects, means for setting the expressions for the notification, and means for evaluating the expressions when the notification containing the expression is generated. This system further includes means for performing an action based on the evaluated expression.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 4 is a schematic illustrating an example of a computer system that can be utilized to execute software of an embodiment of the present invention.

FIG. 5 is a system block diagram of the computer system of FIG. 4.

FIG. 8 is an example of a notification table specifying the notifications an agent supports.

FIG. 9 is a notification variable binding table specifying the variable bindings the agent is configured to send for each of the notifications listed in the table of FIG. 8.

FIG. 10 is a portion of a modified notification variable binding table sent to the agent to instruct the agent how to configure notifications.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
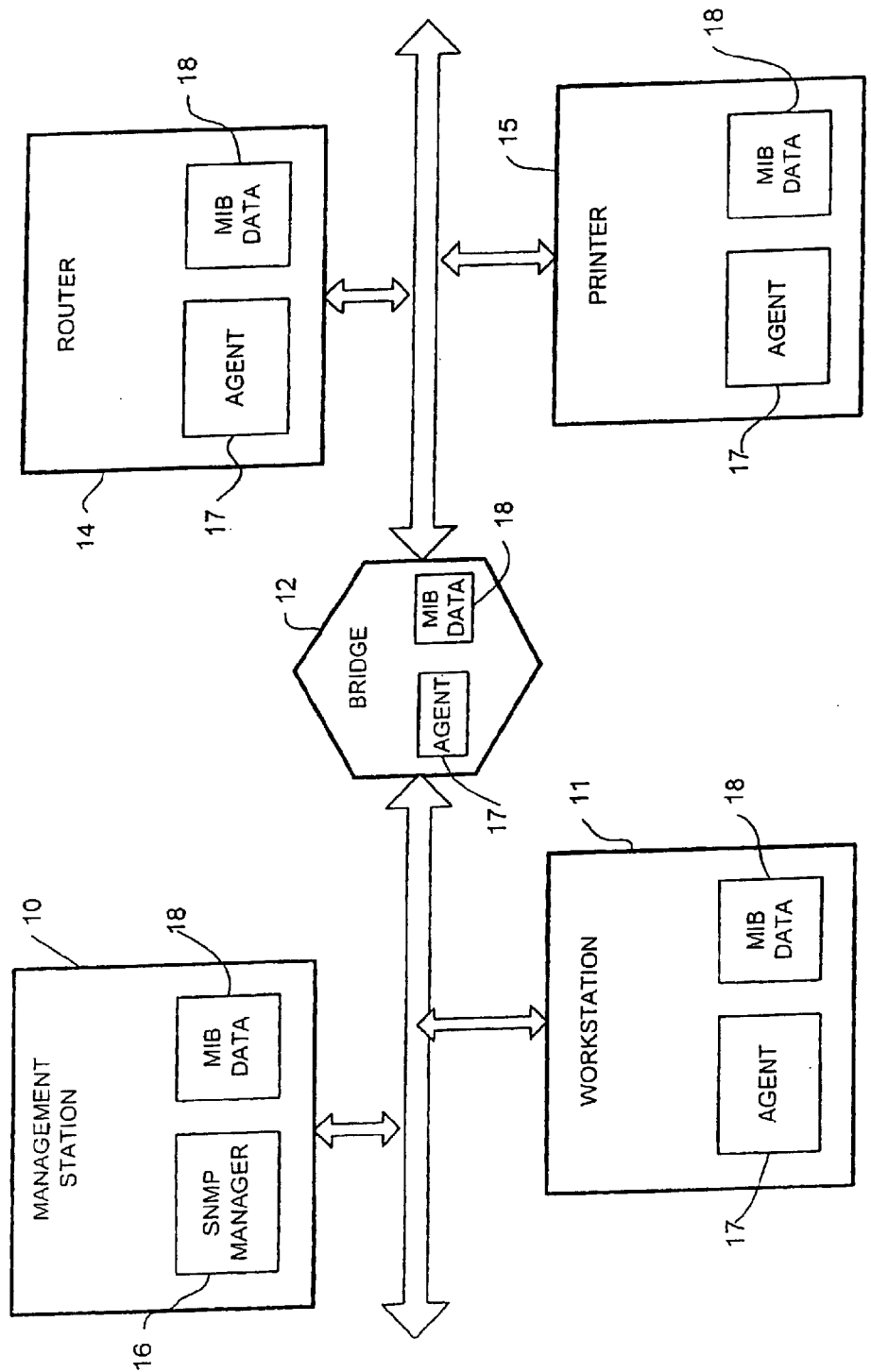
FIG. 1 is a block diagram illustrating an exemplary network utilizing a network management protocol.
Figure 2:
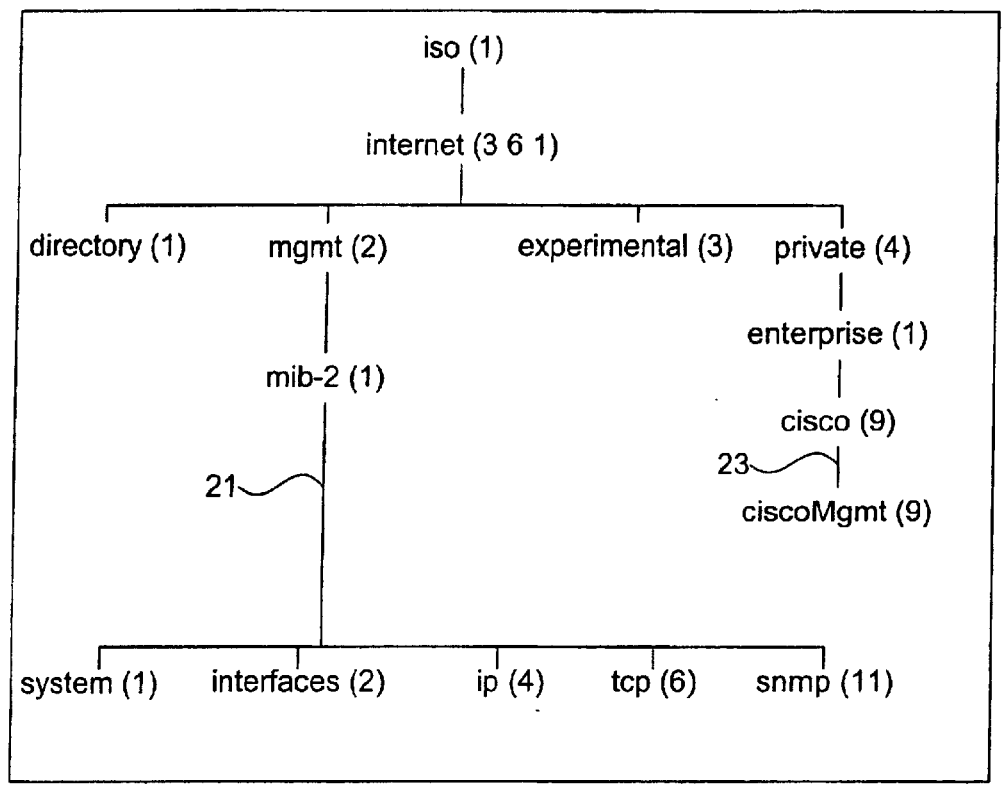
FIG. 2 is a schematic illustrating a portion of a tree structure used to specify MIB object identifiers.
Figure 3:
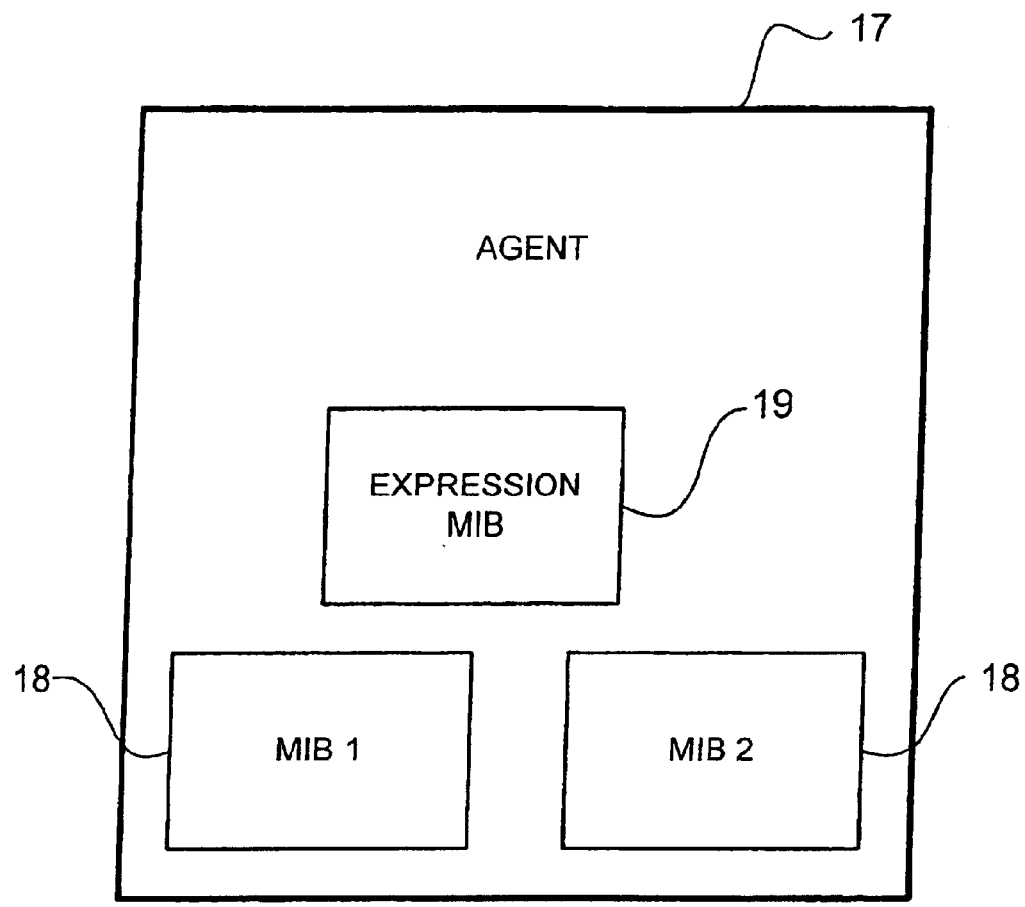
FIG. 3 is a block diagram illustrating an agent of the network of FIG. 1.

The present invention operates in the context of a data communication network including one or more multiple nodes. Nodes of a network may be user workstations, servers, routers, etc. Certain nodes of the network may be network management stations (NMS) 10 used to monitor and control overall network operation (FIG. 1). A node may have both a network management station and an agent. As described below, the method and system of the present invention allow an agent 17 to set expressions based on objects contained in a notification. In one embodiment, a management station 10 may dynamically add new objects to a notification and reorder the objects in the notification so that the management station receives specific information from the agent 17 upon the occurrence of an event. This allows system administrators to tailor notifications to meet specific needs of a network.

FIG. 4 illustrates an example of a computer system that may be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 5) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive may be utilized. Additionally, a data signal embodied in a carrier wave (e.g., in a network including the Internet) may be the computer readable storage medium.

FIG. 5 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 58 in FIG. 5. However, these arrows are only illustrative of one possible interconnection scheme serving to link the subsystems. For example, a local bus may be utilized to connect the central processor 40 to the system memory 42 and display adapter 48. Computer system 20 shown in FIGS. 4 and 5 is only one example of a computer system suitable for use with the invention. Other computer architectures having different configurations of subsystems may also be utilized.

Some of the nodes in a network that employs the present invention may be network devices such as routers and switches. For example, some of the nodes may be specially configured routers such as those available from Cisco Systems, Inc. of San Jose, Calif. A general architecture for some of these machines will appear from the description given below. In an alternative embodiment, a router or switch may be implemented on a general purpose network host machine such as the computer system of FIGS. 4 and 5.

Figure 6:
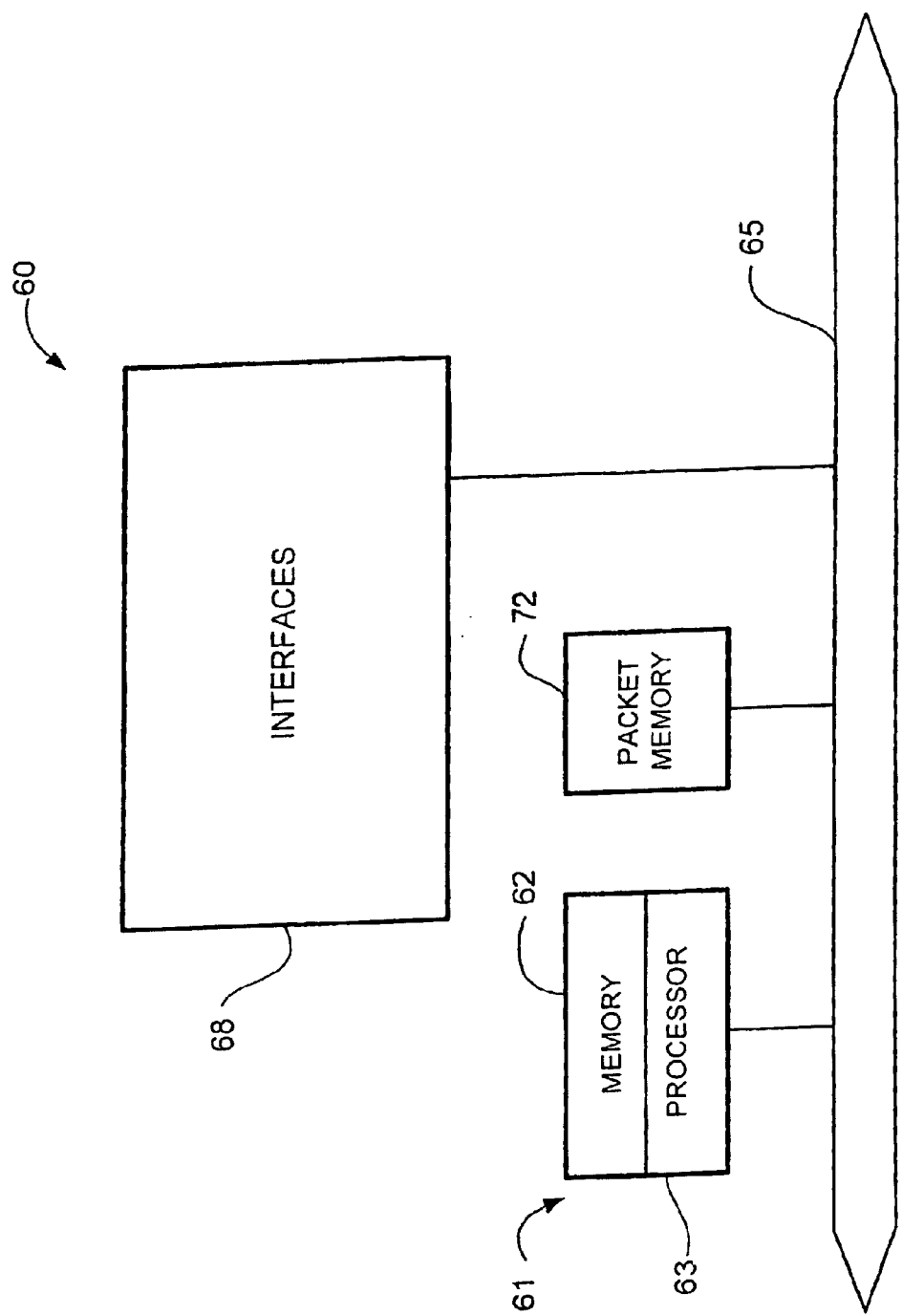
FIG. 6 is a schematic of a router which may represent a network node according to the present invention.

Referring now to FIG. 6, a router 60 suitable for implementing the present invention includes a master central processing unit (CPU) 61, interfaces 68, and a bus 65 (e.g., a PCI bus). As shown, CPU 61 includes a memory 62 and a processor 63. When acting under the control of appropriate software or firmware, CPU 61 is responsible for such router tasks as routing table computations, network management, and general processing of packets. It preferably accomplishes all these functions under the control of software including an operating system and any appropriate applications software. CPU 61 may include one or more processors 63 such as a processor from the Motorola family or microprocessors of the MIPS family of microprocessors. In an alternative embodiment, processor 63 is specially designed hardware for controlling the operations of router 60. Memory 62 can be non-volatile RAM and/or ROM. However, there are many different ways in which memory could be coupled to the system. For example, the router architecture may be distributed/redundant (i.e., master agent on one processor card and sub-agents or sibling agents on other processor cards). Also, there may be two master processors, one active and the other a redundant backup that takes over in the case of a failure or fault with the master processor.

The interfaces 68 are typically provided as interface cards (sometimes referred to as "line cards"). Generally, they control the sending and receiving of data packets over the network and sometimes support other peripherals used with the router 60. Among the interfaces that may be provided are Ethernet interfaces, frame relay interfaces, cable interfaces, DSL interfaces, token ring interfaces, serial interfaces, and the like. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the master microprocessor 61 to efficiently perform routing computations, network diagnostics, security functions, etc. Router 60 may further include a packet memory 72 for intermediate storage of packets forwarded by the router.

Although the system shown in FIG. 6 is one specific router usable in connection with the present invention, it is by no means the only architecture on which the present invention can be implemented. For example, an architecture having a single processor that handles communications as well as routing computations is often used. Further, other types of interfaces and media may also be used with the router.

Regardless of a network device's configuration, it may employ one or more memories or memory modules (including memory 62) configured to store program instructions for the network management operations described herein. The program instructions may control the operation of an operating system or one or more applications, for example. The program instructions and operating system may be stored on any of the media discussed in connection with the computer system of FIGS. 4 and 5, for example.

In one embodiment, the present invention operates in conjunction with SNMP which is described in Case, et al., "A Simple Network Management Protocol (SNMP)," RFC 1157, (IETF May 1990), the contents of which are incorporated by reference herein. As shown in FIG. 1, a network control entity (e.g., SNMP manager) 16 resides on a network management station 10. Agent entity 17 resides on other nodes 11, 12, 14, 15 of the network managed by the manager 16. Manager 16 and agents 17 interact according to a protocol defined by SNMP. The SNMP manager 16 may set system parameters, e.g., TCP/IP parameters at the node occupied by agent 17.

The SNMP manager 16 may include one or more command generators and notification receivers. The manager 16 may further comprise a dispatcher which includes a PDU dispatcher, and transport mapping system, along with a message processing subsystem, and a security subsystem. The manager 16 is operable to query agents 17, get responses from agents, set variables in agents, and acknowledge asynchronous events from agents (if packaged as inform PDUs). The agent 17 may include a dispatcher, message processing subsystem, and a security subsystem along with a command responder application, access control, notification originator application, and proxy forwarder application. The notification originator application generates SNMP messages containing Notification-Class PDUs (e.g., Trap PDU or Inform PDU). The command responder and notification originator applications are in communication with MIB instrumentation. The agent 17 stores and retrieves management data as defined by the Management Information Base (MIB) 18 and can asynchronously signal an event to the management station 10. It is to be understood that the management station 10 and nodes 11, 12, 14, 15 shown in FIG. 1 and described herein are only one example of a network and that the manager and agents may have configurations other than shown and described herein, without departing from the scope of the invention. Furthermore, management protocols other than SNMP may be used.

As previously described, the Management Information Base (MIB) 18 is accessible to SNMP manager 16 to facilitate managing network information. MIB 18 includes object identifiers (OIDs) that identify objects storing particular pieces of information about network operation. Each object includes the OID and a object value which is indicative of network operation at a particular node. An MIB 18 directly accessible to agent 17 stores MIB objects for the node of the agent. Each object includes the OID and the object value. The MIB 18 is a collection of definitions, which define the properties of the managed object within the device to be managed. MIB contents are described in McCloghrie, et al., "Management Information Base for Network Management for TCP/IP-Based Internets: MIB-II", (IETF March 1991), the contents of which are incorporated by reference herein. Examples of MIB objects include things such as: the number of outbound packets that could not be transmitted due to errors, the length of the output packet queue, text string indicating the physical location of the node, etc.

Typically, there are many instances of each managed object within a management domain. The method for identifying instances specified by the MIB module does not allow each instance to be distinguished amongst the set of all instances within a management domain. Instead it allows each instance to be identified only within some scope of context, where there are multiple such contexts within the management domain. Often a context is a physical device, or a logical device, although a context can also encompass multiple devices, or a subset of a single device, or even a subset of multiple devices, but a context is always defined as a subset of a single SNMP entity. Thus, in order to identify an individual item of management information within the management domain, its contextName and contextEngineID must be identified in addition to its object type and its instance. For example, the managed object type ifdescr is defined as the description of a network interface. To identify the description of a device's first network interface, five pieces of information are needed, the snmpEngineID of the SNMP entity which provides access to the management information at the device, the contextName, the contexEngine ID, the managed object type (e.g., ifDescr), and the instance. Since the notification contains objects that are specified in the MIB definition, the instances of the object will be borrowed when the objects within the notification are modified, as described below.

The management station 10 interacts with the agents 17 using the SNMP protocol. This protocol allows the management station to query the state of an agent's local objects, and change them if necessary. Most of SNMP consists of this query-response type communication. However, sometimes events happen that are not planned. For example managed nodes can crash and reboot, interfaces can go down and come back up, or congestion can occur. When an agent 17 notices that a event of interest to one or more network management stations has occurred, it immediately reports the event to all management stations 10 in its configuration list. This report is called an SNMP notification. The report typically states that some event has occurred. It is up to the management station 10 to then issue queries to find out all the details.

When an application decides to send a notification, it may call one of the following functions, for example:

snmp:send_notification(Agent, Notification, Receiver [NotifyName, Varbinds, ContextName])

The agent 17 may then perform a get operation to retrieve the object values which are defined in the notification specification. The notification is sent to all managers 16 defined in the target and notify tables, either unacknowledged as Traps, or acknowledged as Inform requests.

Figure 7:
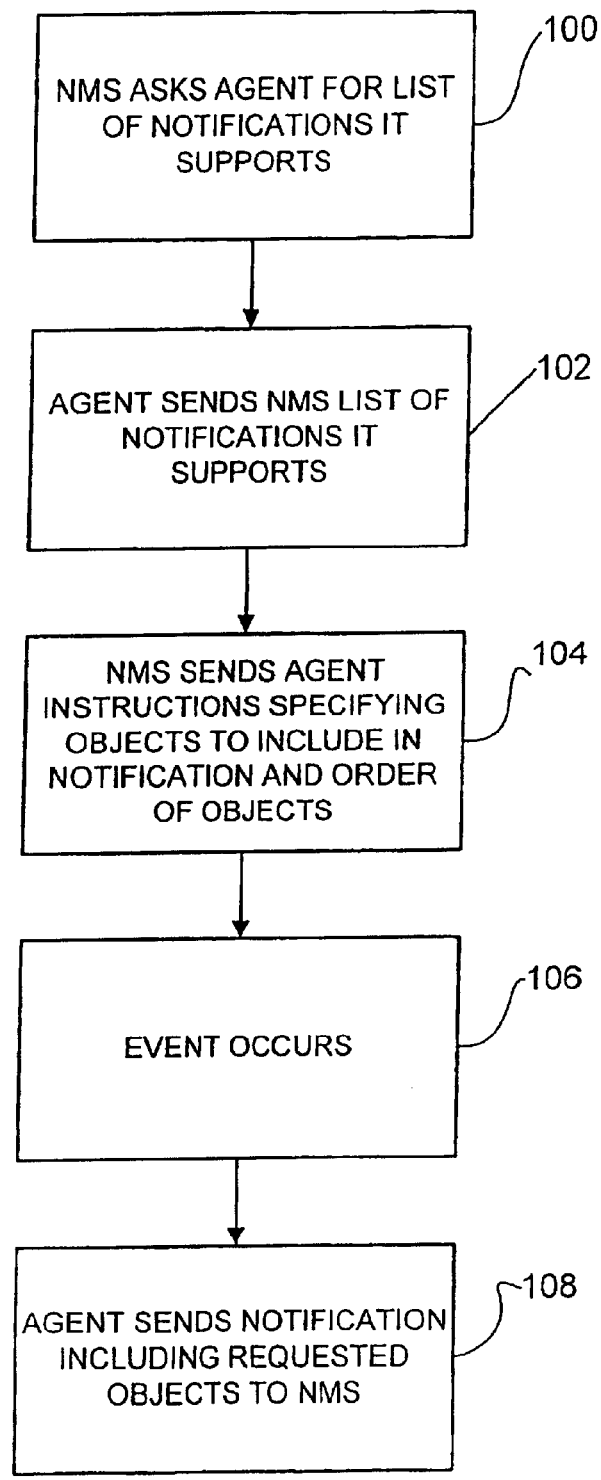
FIG. 7 is a flowchart illustrating a process for defining objects for a notification.

FIG. 7 is a flowchart illustrating a process of the present invention for specifying objects to be contained within the notification. The method is preferably performed by software, however, the method may also be implemented in hardware. The method is preferably performed by the management station 10, however, it may be performed by one of the agents 17, or any other device in the network.

At step 100, the network management station 10 sends a Get or GetNext request to all of the agents 17 asking for a list of notifications that it supports. The request may also ask for the associated varible bindings (i.e., OID +value (also referred to as a varbind)), or a separate request may be sent. The agents 17 then respond to the management station 10 with a list of notifications it supports (step 102). The agent 17 may send a table as shown in FIG. 8, listing the notifications that it currently supports along with a table, shown in FIG. 9, listing the notification varbinds. The first table may include, for example, linkup, link down, ciscoPingCompletion, or any other event that results in a notification being sent from the agent 17, such as authentication failure, cold start, warm start, or neighbor loss (FIG. 8). It is to be understood that notifications may be supported for events other than those listed herein. The second table includes a list of varbinds for each notification supported by the agent (FIG. 9). Each varbind includes an object identifier (OID) and the corresponding value (as described above). The management station 10 next tells each agent 17 which objects to include in each of the notifications and the order of the objects (step 104). The management station 10 may provide this information as a MIB containing a modified list of varbinds, as shown in FIG. 10, for example. FIG. 10 shows a portion of a table containing a modified varbind list and the corresponding notification index and varbind index. The agent's notifications originally contained the following varbinds: ifIndex; ifdescr; ifType; ciscoPingCompleted; ciscoPingSentPackets; and ciscoPingReceivedPackets. The management station added the following varbinds: ifAdmin- Status and ifOperStatus. It also changed the location of the original three varbinds to insert the two new varbinds. The new list of varbinds may include additional varbinds or change the context of the existing varbinds. When an event occurs, the agent 17 sends to the management station 10 a notification containing the varbinds requested by the management station (steps 106 and 108).

The notifications received at the management station 10 may also be filtered to reduce unnecessary or unwanted traps by setting expressions based on one or more of the objects contained in the notification. After the expressions are set they are evaluated each time a notification is generated and appropriate action is taken. An expression may result in a notification being dropped or trigger an event from an event MIB. For example, if a card containing a large number of modems (e.g., sixty) is unplugged at runtime, sixty linkdown notifications and an entConfigChange notification (indicating that a card was pulled out) are generated. To reduce the number of notifications received, expressions can be set based on the entConfigChange. Once the card being pulled is identified, the linkDown notification for the modems on that card are suppressed. An expression may have the following format, for example:

If(notifListTable.1.0 exists) and

Instance of (notifVarbindListTable.1.1)=7 then suppress notification.

The "0" in "notifListTable.1.0" may be a dummy instance value, for example.

Figure 11:
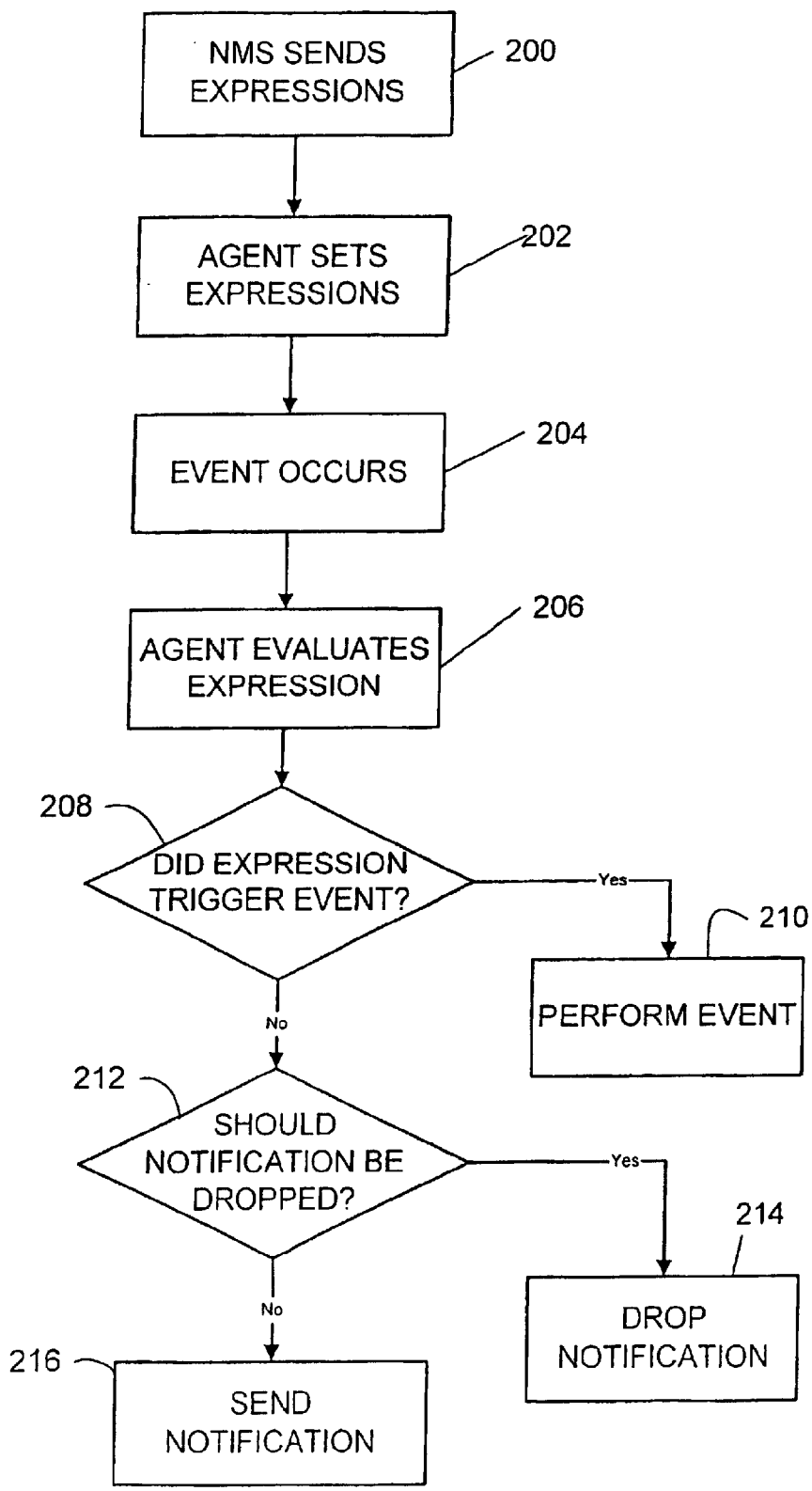
FIG. 11 is a flowchart illustrating a process for setting expressions based on the objects contained in a notification.

FIG. 11 is a flowchart illustrating a process for setting expressions based on objects contained within a notification. After the management station 10 has learned what notifications an agent supports and modifies the list of objects for the notifications (as described above with respect to FIG. 7), the management station tells the agent 17 what expressions to compute before sending out a notification (step 200). The expressions are written to use the object listing for each notification provided by the MIB sent by the management station 10. The expression may include, for example, NLT index, NLV index, OID (specifying the object within the trap) and an instance (identifying a specific interface). The agent 17 then sets the expression (step 202). Upon the occurrence of an event (step 204), the expression will be evaluated (step 206). The expression may trigger an event in which case the event will be performed (steps 208 and 210). For example, when an expression is evaluated as true, the event management system may generate an event to notify the appropriate application. The expression may also result in the notification being dropped (steps 212 and 214). If the notification is not dropped, it is sent to the management station 10 or other network device (step 216).

The system of the present invention allows a system administrator to evaluate expressions on an SNMP agent based on a notification's content and take corrective action such as aggregating data or triggering other expressions. The use of expressions in notifications provides the ability to automatically detect network problems without having to send messages such as a Get message to obtain additional information before identifying a problem.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for setting expressions at an agent, comprising:

receiving a SNMP message from a management station specifying objects for notifications supported by the agent and expressions based on said objects;

setting said an expression MIB, for the notifications;

evaluating said expression by said expression MIB, when the notification containing the expression is generated; and performing an action based on the evaluated expression.

2. The method of claim 1 wherein performing an action comprises suppressing the notification based on a result of the evaluated expression.

3. The method of claim 1 wherein performing an action comprises triggering an event based on a result of the evaluated expression.

4. The method of claim 1 wherein performing an action comprises sending the notification to the management station.

5. A computer program product for setting expressions at an agent, comprising:

code that receives a message from a management station specifying objects for notifications supported by the agent and expressions based on said objects;

code that sets expressions for the notifications;

code that evaluates said expressions when the notification containing the expression is generated;

code that performs an action based on the evaluated expression; and a computer-readable storage medium for storing the codes.

6. The computer program product of claim 5 wherein the code that performs an action comprises code that suppresses the notification based on a result of the evaluated expression.

7. The computer program product of claim 5 wherein the code that performs an action comprises code that triggers an event based on a result of the evaluated expression.

8. The computer program product of claim 5 wherein the code that performs an action comprises code that sends the notification to the management station.

9. A system for setting expressions at an agent, comprising:

means for receiving a SNMP message from a management station specifying objects for notifications supported by the agent and expressions based on said objects;

means for setting an expression MIB for the notifications;

means for evaluating said expressions by said expression MIB, when the notification containing the expression is generated; and means for performing an action based on the evaluated expression.

10. A system for setting expressions at an agent, comprising:

a processor configured to receive a SNMP message from a management station specifying objects for notification supported by the agent and expressions based on said objects, set an said expression MIB for the notification, evaluate said expressions by said expression MIB, when the notification containing the expression is generated, and perform an action based on the evaluated expression; and memory for storing said expressions.

11. The method of claim 1 further comprising sending a list of notifications supported by the agent to the management station, wherein the message received from the management station is based on the list of notifications sent to the management station from the agent.

12. The method of claim 11 wherein sending a list of notifications supported by the agent comprises sending a table listing notifications the agent supports.

13. The method of claim 11 wherein sending a list of notifications supported by the agent comprises sending a list of variable bindings corresponding to the list of notifications.

14. The method of claim 13 wherein the message received from the management station includes the list of variable bindings sent to the management station and new variable bindings added by the management station.

15. The method of claim 1 wherein the message received from the management station specifies the order of the objects to be included in the specified notifications.

16. The method of claim 1 wherein the message received from the management station is a MIB containing a list of variable bindings and a corresponding notification index.

17. The method of claim 1 wherein the message received from the management station instructs the agent which expressions to compute before sending out a notification.

18. The method of claim 17 wherein the expressions are based on the objects specified in the message from the management station.

19. The method of claim 17 wherein at least one of the expressions trigger an event at the agent.

20. The method of claim 4 wherein sending the notification to the management station comprises sending a notification containing variable bindings requested by the management station in the message received therefrom.

21. A method for generating notification based expressions at a management station, comprising:

identifying notifications supported by an agent;

specifying objects for at least one of the notifications;

defining one or more expressions based on the objects specified for the notification; and sending a list of said objects and expressions embedded in a SNMP message to an expression MIB of the agent to configure the notifications received at the management station upon occurrence of an event at the agent.

22. The method of claim 21 wherein sending the objects and expressions comprises sending a management information base.

23. The method of claim 21 wherein identifying notifications supported by an agent comprises receiving at a management station a list of notifications supported by the agent.

24. The method of claim 21 wherein specifying objects comprises adding one or more objects to a list of objects contained within the notification.

25. The method of claim 21 wherein specifying objects comprises reordering the objects in the notification.

* * * * *

UNITED STATES PATENT AND TRADEMARK OFFICE
CERTIFICATE OF CORRECTION

PATENT NO. : 6,757,901 B1
DATED : June 29, 2004
INVENTOR(S) : McCloghrie et al.

It is certified that error appears in the above-identified patent and that said Letters Patent is hereby corrected as shown below:

Column 10,
Line 2, please correct as follows:
1. A method for setting expressions at an agent, comprising:
   receiving a SNMP message from a management station specifying objects for notifications supported by the agent and expressions based on said objects;
   setting an expression MIB, for notifications;
   evaluating said expression by said expression MIB, when the notification containing the expression is generated; and
   performing an action based on the evaluated expression.

Signed and Sealed this

Twenty-first Day of December, 2004

JON W. DUDAS
*Director of the United States Patent and Trademark Office*